United States Patent
Yoon et al.

(10) Patent No.: US 11,392,474 B2
(45) Date of Patent: Jul. 19, 2022

(54) ELECTRONIC DEVICE FOR CONTROLLING INTERFACE BETWEEN A PLURALITY OF INTEGRATED CIRCUITS AND OPERATION METHOD THEREOF

(71) Applicant: Samsung Electronics Co., Ltd., Suwon-si (KR)

(72) Inventors: Suha Yoon, Suwon-si (KR); Mooyoung Kim, Suwon-si (KR); Minjung Kim, Suwon-si (KR); Hyunkeun Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/118,071

(22) Filed: Dec. 10, 2020

(65) Prior Publication Data

US 2021/0173756 A1     Jun. 10, 2021

(30) Foreign Application Priority Data

Dec. 10, 2019  (KR) .................. 10-2019-0163820

(51) Int. Cl.
*G06F 11/30*     (2006.01)
*G06F 1/3215*    (2019.01)
(Continued)

(52) U.S. Cl.
CPC ........ *G06F 11/3041* (2013.01); *G06F 1/3215* (2013.01); *G06F 11/0757* (2013.01); *G06F 11/3062* (2013.01); *G06F 13/423* (2013.01)

(58) Field of Classification Search
CPC ........ G06F 1/3234; G06F 1/3287; G06F 1/26; G06F 1/24; G06F 9/445; G06F 13/42
See application file for complete search history.

(56) References Cited

U.S. PATENT DOCUMENTS 9,213,393 B2 * 12/2015 Cooper ................. G06F 1/3253
9,256,268 B2 *  2/2016 Wang ................... G06F 1/3203
(Continued)

FOREIGN PATENT DOCUMENTS

JP      5242797 B2    7/2013
KR   10-1492582 B1    2/2015
(Continued)

OTHER PUBLICATIONS

International Search Report of the International Searching Authority in connection with International Application No. PCT/KR2020/017524 dated Mar. 10, 2021, 3 pages.

*Primary Examiner* — Raymond N Phan

(57) ABSTRACT

An apparatus and method for controlling an interface between a plurality of processors in an electronic device are disclosed. The electronic device may include: a first integrated circuit; a second integrated circuit; and a Peripheral Component Interconnect Express (PCIe) interface interconnecting the first integrated circuit and the second integrated circuit, wherein the first integrated circuit may be configured to identify the required latency level associated with a service provided by the electronic device, and restrict the use of at least one power mode among a plurality of power modes supported by the PCIe interface, based on the required latency level associated with the service. Additional embodiments are possible.

20 Claims, 7 Drawing Sheets

(51) Int. Cl.
   *G06F 13/42* (2006.01)
   *G06F 11/07* (2006.01)

(56) References Cited

U.S. PATENT DOCUMENTS

| | | |
|---|---|---|
| 10,409,744 B1 | 9/2019 | Gross et al. |
| 2008/0172507 A1* | 7/2008 | Thurber ................ G06F 9/3879 710/105 |
| 2010/0074109 A1 | 3/2010 | Klingenbrunn et al. |
| 2010/0110952 A1* | 5/2010 | Diab ................. H04L 12/40039 370/311 |
| 2011/0185011 A1 | 7/2011 | Shuman et al. |
| 2013/0007483 A1* | 1/2013 | Diefenbaugh ........ G06F 1/3206 713/320 |
| 2013/0195210 A1* | 8/2013 | Swarbrick ............... H04L 25/02 375/259 |
| 2013/0198538 A1 | 8/2013 | Diab et al. |
| 2013/0262883 A1* | 10/2013 | Saunders ................ G06F 13/42 713/300 |
| 2013/0311809 A1* | 11/2013 | Sood ....................... H04L 12/10 713/323 |
| 2013/0332503 A1* | 12/2013 | Bae ......................... H04W 4/20 709/201 |
| 2014/0047156 A1* | 2/2014 | Billi ..................... G06F 13/4022 710/314 |
| 2015/0074440 A1* | 3/2015 | Cherukuri ............. G06F 1/3287 713/324 |
| 2015/0370749 A1* | 12/2015 | Yu ....................... G06F 13/4243 710/301 |
| 2016/0274923 A1* | 9/2016 | Harriman .............. G06F 13/102 |
| 2018/0004273 A1* | 1/2018 | Leucht-Roth ......... G06F 1/3287 |
| 2018/0213579 A1 | 7/2018 | Hong et al. |
| 2019/0094945 A1 | 3/2019 | Hashimoto |
| 2019/0163254 A1 | 5/2019 | Dewey et al. |
| 2020/0336430 A1 | 10/2020 | Kim et al. |

FOREIGN PATENT DOCUMENTS

| | | |
|---|---|---|
| KR | 10-1722330 B1 | 4/2017 |
| KR | 10-2020-0122845 A | 10/2020 |

* cited by examiner

ELECTRONIC DEVICE FOR CONTROLLING INTERFACE BETWEEN A PLURALITY OF INTEGRATED CIRCUITS AND OPERATION METHOD THEREOF

CROSS-REFERENCE TO RELATED APPLICATION

This application is based on and claims priority under 35 U.S.C. § 119 to Korean Patent Application No. 10-2019-0163820, filed on Dec. 10, 2019, in the Korean Intellectual Property Office, the disclosure of which is incorporated by reference herein in its entirety.

BACKGROUND

1. Field

The disclosure relates to an apparatus and method for controlling an interface between a plurality of integrated circuits in an electronic device.

2. Description of Related Art

With advances in information and communication technology and semiconductor technology, electronic devices capable of performing information processing are being popularized. Electronic devices may provide various functions related to phone calls, messages, cameras, electronic payments, or the Internet.

An electronic device may include a plurality of processors to provide various functions. For example, the electronic device may include an application processor (AP) for executing application programs related thereto and a communication processor (CP) for handling communication functions thereof. For instance, the application processor and the communication processor may be composed of different integrated circuits (e.g., system-on-chips (SoCs)).

SUMMARY

To meet wireless data traffic demands required by users, electronic devices may support $5^{th}$ generation (5G) communication (e.g., new radio (NR) communication) capable of transmitting and/or receiving signals using frequencies (e.g., 3 GHz to 300 GHz) in very high frequency bands (e.g., mmWave).

In an electronic device, to provide relatively high throughput in 5G communication, a first integrated circuit related to an application processor (AP) and a second integrated circuit related to a communication processor (CP) may be interconnected through a Peripheral Component Interconnect Express (PCIe) interface. To reduce current consumption caused by the PCIe interface, the electronic device may switch the power mode of the PCIe interface based on the operating state of the PCIe interface. For example, the power mode of the PCIe interface may include L0 (fully active state), L0s (electrical idle/standby state), L1 (lower power standby/slumber state), L2 (low power sleep state), and/or L3 (link off state).

However, when the electronic device is delivering a delay-sensitive service such as a virtual reality (VR) service or an augmented reality (AR) service, the quality of the delay-sensitive service may be degraded due to the latency caused by a power mode transition of the PCIe interface. Hence, it is necessary to develop a method that enables the electronic device to provide a delay-sensitive service while reducing the power consumption due to the PCIe interface.

Embodiment of the disclosure may provide an apparatus and method for controlling an interface between a plurality of integrated circuits in an electronic device.

According to various embodiments, there is provided an electronic device. The electronic device may include: a first integrated circuit; a second integrated circuit; and a Peripheral Component Interconnect Express (PCIe) interface interconnecting the first integrated circuit and the second integrated circuit, wherein the first integrated circuit may be configured to identify the required latency level associated with a service provided by the electronic device, and restrict the use of at least one power mode among a plurality of power modes supported by the PCIe interface based on the required latency level associated with the service.

According to various embodiments, an operation method for an electronic device is provided. The operation method may include: identifying the required latency level associated with a service provided by the electronic device; and restricting, based on the required latency level associated with the service provided by the electronic device, the use of at least one power mode among a plurality of power modes supported by a Peripheral Component Interconnect Express (PCIe) interface interconnecting a first integrated circuit and a second integrated circuit.

According to various embodiments, an electronic device is provided. The electronic device may include: a first integrated circuit including a first processor and a Peripheral Component Interconnect Express (PCIe) host; a second integrated circuit including a second processor and a PCIe device; and a PCIe interface interconnecting the PCIe host of the first integrated circuit and the PCIe device of the second integrated circuit, wherein the first processor may be configured to identify the required latency level associated with a service provided by the electronic device, and restrict the use of at least one power mode among a plurality of power modes supported by the PCIe interface based on the required latency level associated with the service.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described in detail with reference to accompanying drawings.

Figure 1:
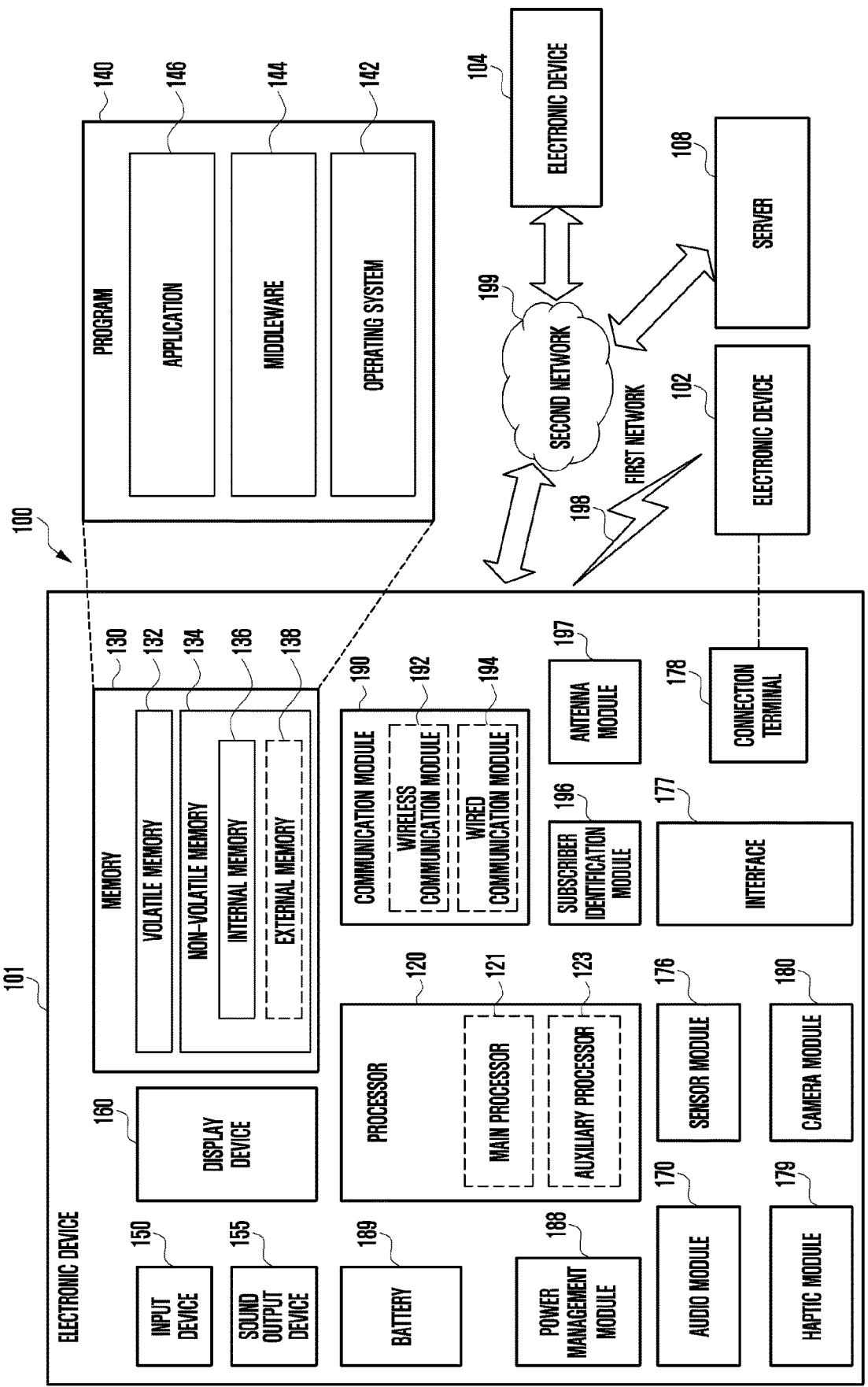
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
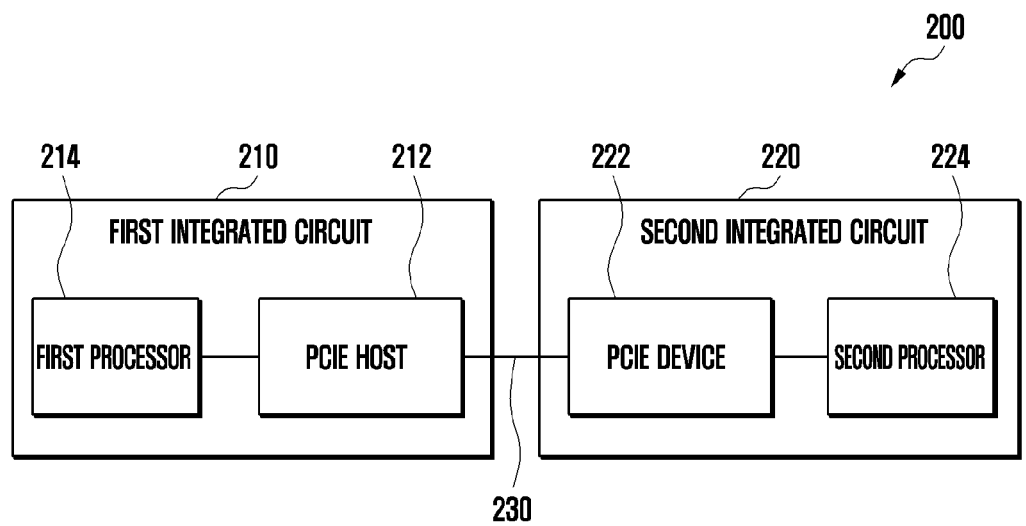
FIG. 2A illustrates a block diagram of an electronic device including a plurality of integrated circuits according to various embodiments.

FIG. 2A illustrates a block diagram of an electronic device 200 including a plurality of integrated circuits according to various embodiments. For example, the electronic device 200 may correspond to the electronic device 101 in FIG. 1.

With reference to FIG. 2A, in various embodiments, the electronic device 200 may include a plurality of integrated circuits 210 and 220. In one embodiment, the first integrated circuit 210 may be the same as the main processor 121 in FIG. 1 or may be included in the main processor 121. The second integrated circuit 220 may be the same as the auxiliary processor 123 in FIG. 1 or may be included in the auxiliary processor 123. For example, the first integrated circuit 210 or the second integrated circuit 220 may include an application processor (AP) or a communication processor (CP).

In various embodiments, the first integrated circuit 210 and the second integrated circuit 220 may be connected through a Peripheral Component Interconnect Express (PCIe) interface 230. In one embodiment, the first integrated circuit 210 may include a PCIe host 212 for connecting to the second integrated circuit 220 through the PCIe interface 230. The second integrated circuit 220 may include a PCIe device 222 for connecting to the first integrated circuit 210 through the PCIe interface 230. For example, the PCIe host 212 of the first integrated circuit 210 may be connected to the PCIe device 222 of the second integrated circuit 220 through the PCIe interface 230.

In various embodiments, the first integrated circuit 210 may include the PCIe host 212 and/or a first processor 214. For example, the first integrated circuit 210 may be configured in the form of a system-on-chip (SoC) where one or more elements required for the electronic device 200 (e.g., PCIe host 212 and/or first processor 214) are included in a single chip.

In various embodiments, the first processor 214 may control the power mode of the PCIe interface 230 interconnecting the first integrated circuit 210 and the second integrated circuit 220. For example, the first processor 214 may control the PCIe host 212 to change the power mode of the PCIe interface 230 based on the operating state of the PCIe interface 230. For instance, the power mode may include at least one of L0 (fully active state), L0s (electrical idle/standby state), L1 (lower power standby/slumber state), L2 (low power sleep state), or L3 (link off state).

In various embodiments, the first processor 214 may restrict the power mode of the PCIe interface 230 from transitioning. In one embodiment, the first processor 214 may identify the required latency level associated with a service provided by the electronic device 200. Based on the required latency level associated with the service provided by the electronic device 200, the first processor 214 may control the PCIe host 212 to restrict transitioning to at least one of the plurality of power modes supported by the PCIe interface 230. For example, the first processor 214 may restrict the PCIe interface 230 from transitioning to the power mode whose delay time required to return to the active mode (e.g., L0 mode) does not satisfy the required latency level associated with the service provided by the electronic device 200. For example, the required latency level may be identified based on at least one of the application running on the electronic device 200, application requirements from the network, access to mobile edge computing (MEC), network session and/or bearer information, quality of service (QoS) per flow (e.g., QoS information), UE route selection policy (URSP) related information, or local access data network (LADN) related information. For instance, the required latency level may include the maximum delay time required to provide the service.

In various embodiments, based on the required latency level associated with the service, the first processor 214 may create at least one logical channel path (e.g., endpoint) between the first integrated circuit 210 and the second integrated circuit 220 for data transmission and reception. In one embodiment, the PCIe drivers (e.g., inter-process communication (IPC) driver) driven by the first processor 214 of the first integrated circuit 210 and the second processor 224 of the second integrated circuit 220 may manage a plurality of logical channels identifying data. The data transmitted and received through the plurality of logical channels may be transmitted and received between the first integrated circuit 210 and the second integrated circuit 220 through a logical channel path (e.g., endpoint) of the PCIe interface 230. The PCIe interface 230 may generate the plurality of logical channel paths between the PCIe host 212 and the PCIe device 222 and assign different quality of service (QoS) levels to the individual logical channel paths for data transmission and reception. For example, a first logical channel path may be set for transmitting real-time data. A second logical channel path may be set for transmitting a relatively large amount of data. In one embodiment, when the required latency level associated with the service (or application) to be provided by the electronic device 200 is lower than the reference level, the first processor 214 may determine that the service has a low-latency requirement (e.g., ultra-reliable and low latency communication (URLLC) requirement). In this example, the first processor 214 may allocate a logical channel path for the service having a low-latency requirement, and configure the logical channel path to have a QoS level corresponding to low-latency data transmission.

In various embodiments, based on the throughput required by the service provided (or to be provided) by the electronic device 200, the first processor 214 may adjust at least one of the link (e.g., PCIe link) of the PCIe interface 230 or the number of lanes to be used for data transmission and/or reception in the PCIe interface 230. For example, the throughput required by the service may include a throughput required by at least one of an application running in the foreground or an application running in the background. For instance, the number of lanes may be adjusted by changing a PCIe register parameter value. As an example, the number of lanes to be used for data transmission and/or reception may include the number of lanes to be aggregated into one link. For example, the link speed may be adjusted by changing a PCIe register parameter value.

In one embodiment, one link of the PCIe interface 230 may support at least one lane. For example, one lane may include a set of one differential signal pair for data transmission and one differential signal pair for data reception. One or more lanes (e.g., 1 to 32) may be aggregated in the link of the PCIe interface 230 to provide a relatively high data rate. For example, if Y lanes operating at a speed of X (e.g., throughput or bits per second (bps)) are aggregated into one link, the PCIe interface 230 can provide a speed of X*Y (e.g., throughput or bps).

In one embodiment, the link speed that can be supported by a link of the PCIe interface 230 (e.g., PCIe link) may be recorded in a register. For example, the link speed that can be supported by a link (e.g., PCIe link) of the PCIe interface 230 may be recorded in "link capabilities 2 register". As an example, the link capabilities 2 register may consist of 1 byte. In this case, each bit constituting the 1-byte link capabilities 2 register may indicate information related to the link speed supported by the PCIe link. For instance, "bit 0" of the link capabilities 2 register indicates whether a speed of 2.5 GT/s is supported, "bit 1" indicates whether a speed of 5.0 GT/s is supported, and "bit 2" indicates whether a speed of 8.0 GT/s is supported. As an example, the link control 2 register may consist of 2 bytes. In this case, the bitfield (e.g., 0 to 3 bits) of a first range of the link control 2 register may include information related to the target link speed of the PCIe interface 230. The link speed of the PCIe link may be limited by the bitfield of the first range of the link control 2 register. For example, when the PCIe link can support a first speed (e.g., 8.0 GT/s), if the bit field of the first range is encoded as "0010", the speed of the PCIe link may be restricted to a second speed (e.g., 5.0 GT/s) relatively slower than the first speed according to the bitfield of the first range set to "0010". As an example, the bitfield of the first range of the link control 2 register encoded as "0001" may indicate "bit 0" of the link capabilities 2 register, the bitfield encoded as "0010" may indicate "bit 1" of the link capabilities 2 register, and the bitfield encoded as "0011" may indicate "bit 2" of the link capabilities 2 register. For instance, the bitfield of the first range of the link control 2 register may be set based on the throughput required by a service provided or to be provided by the electronic device 200.

In various embodiments, the second integrated circuit 220 may include the PCIe device 222 and/or the second processor 224. For example, the second integrated circuit 220 may be configured in the form of a system-on-chip (SoC) where one or more elements required for the electronic device 200 (e.g., PCIe device 222 and/or second processor 224) are included in a single chip.

In various embodiments, the second processor 224 may control the power mode of the PCIe interface 230 under the control of the first integrated circuit 210 (or first processor 214). For example, when a transition request signal for the power mode of the PCIe interface 230 is received from the first integrated circuit 210 (or first processor 214), the second processor 224 may control the PCIe device 222 to transition the power mode of the PCIe interface 230.

In various embodiments, the second processor 224 may generate at least one logical channel path (e.g., endpoint) between the first integrated circuit 210 and the second integrated circuit 220 for data transmission and reception under the control of the first integrated circuit 210 (or first processor 214). For example, when a request signal for logical channel generation is received from the first integrated circuit 210 (or first processor 214), the second processor 224 may generate a logical channel of the PCIe interface 230.

In various embodiments, the first integrated circuit 210 and the second integrated circuit 220 may be connected through a universal serial bus (USB) interface. In this configuration, the first processor 214 of the first integrated circuit 210 may control the operation of the USB interface in the same manner as the PCIe interface 230. In one embodiment, the first processor 214 may restrict the power mode of the USB interface interconnecting the first integrated circuit 210 and the second integrated circuit 220 from transitioning based on the required latency level associated with a service. In one embodiment, based on the required latency level associated with the service, the first processor 214 may generate a logical channel path (e.g., endpoint) of the USB interface for data transmission and reception between the first integrated circuit 210 and the second integrated circuit 220. In one embodiment, the first processor 214 may adjust the number of lanes to be used for data transmission and reception in the USB interface based on the throughput required by the service provided by the electronic device 200.

Figure 2B:
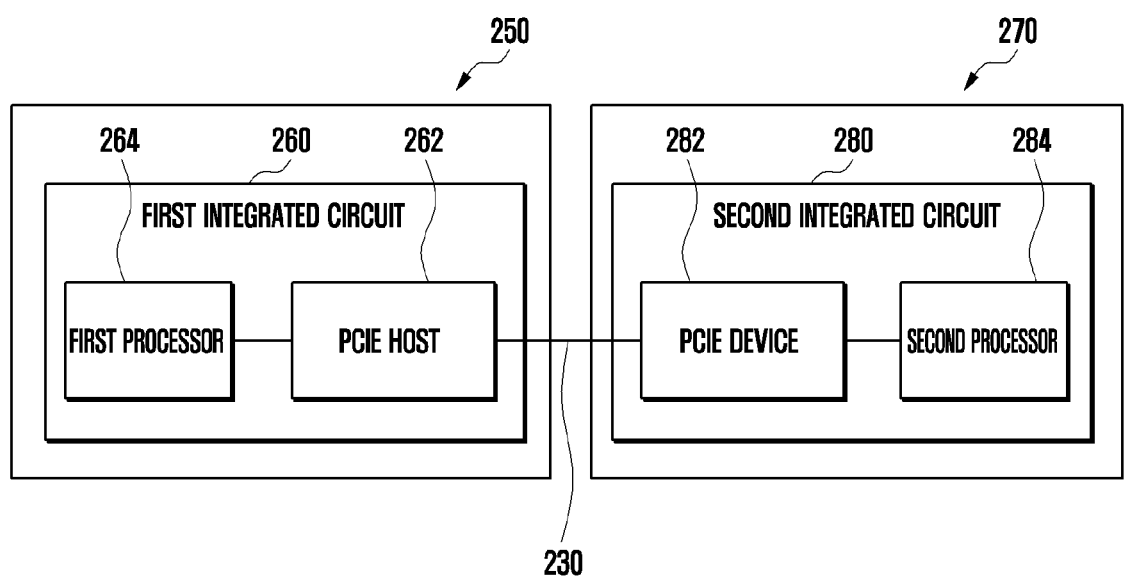
FIG. 2B illustrates a block diagram of electronic devices including integrated circuits according to various embodiments.

FIG. 2B illustrates a block diagram of electronic devices including integrated circuits according to various embodiments. For instance, the first electronic device 250 and/or the second electronic device 270 may correspond to the electronic device 101 in FIG. 1.

With reference to FIG. 2B, in various embodiments, the first electronic device 250 and the second electronic device 270 may be connected through a Peripheral Component Interconnect Express (PCIe) interface 230. In one embodiment, the first integrated circuit 260 included in the first electronic device 250 may be connected to the second integrated circuit 280 included in the second electronic device 270 through the PCIe interface 230.

In various embodiments, the first integrated circuit 260 of the first electronic device 250 may include a PCIe host 262 and/or a first processor 264. In the following description, the internal configuration of the first integrated circuit 260 may operate similarly to the internal configuration of the first integrated circuit 210 in FIG. 2A. For example, the PCIe host 262 and the first processor 264 of the first integrated circuit 260 in FIG. 2B may operate similarly respectively to the PCIe host 212 and the first processor 214 in FIG. 2A. To avoid a repeated description with FIG. 2A, a detailed description on the internal configuration of the first integrated circuit 260 will be omitted.

In various embodiments, the second integrated circuit 280 of the second electronic device 270 may include a PCIe device 282 and/or a second processor 284. In the following description, the internal configuration of the second integrated circuit 280 may operate similarly to the internal configuration of the second integrated circuit 220 in FIG. 2A. For example, the PCIe device 282 and the second processor 284 of the second integrated circuit 280 in FIG. 2B may operate similarly respectively to the PCIe device 222 and the second processor 224 in FIG. 2A. To avoid a repeated description with FIG. 2A, a detailed description on the internal configuration of the second integrated circuit 280 will be omitted.

Figure 3:
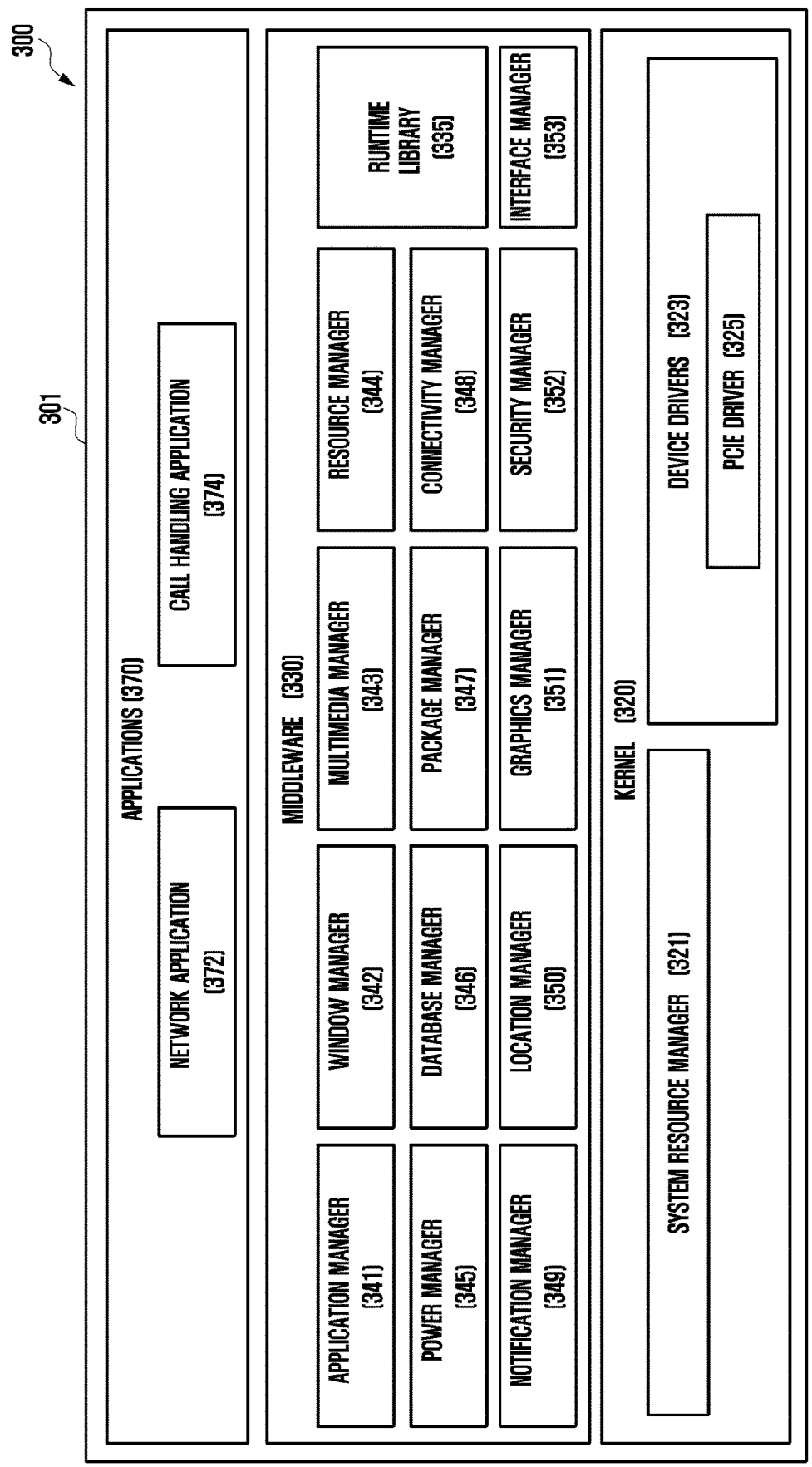
FIG. 3 illustrates a diagram illustrating a structure of programs according to various embodiments.

FIG. 3 illustrates a diagram illustrating a structure of programs according to various embodiments. For example, the electronic device 300 may correspond to the electronic device 101 in FIG. 1, the electronic device 200 in FIG. 2A, or the first electronic device 250 in FIG. 2B. As an example, the programs 301 of the electronic device 300 are programs (e.g., programs 140 in FIG. 1) on the memory (e.g., memory 130 in FIG. 1), and may be executed by the first processor (e.g., first processor 214 in FIG. 2A or the first processor 264 in FIG. 2B) of the first integrated circuit (e.g., first integrated circuit 210 in FIG. 2A or the first integrated circuit 260 in FIG. 2B).

With reference to FIG. 3, in various embodiments, the programs 301 may include a kernel 320 (e.g., operating system 142 in FIG. 1), middleware 330 (e.g., middleware 144 in FIG. 1), and/or applications 370 (e.g., applications 370 in FIG. 1). At least some of the programs 301 may be preloaded in the electronic device 300 or may be downloaded from an external electronic device (e.g., electronic device 102 or 104 or server 108 in FIG. 1).

In various embodiments, the kernel 320 may include a system resource manager 321 and/or device drivers 323. In one embodiment, the system resource manager 321 may control, allocate, or reclaim system resources. For example, the system resource manager 321 may include a process manager, a memory manager, or a file system manager. In one embodiment, the device drivers 323 may include a PCIe driver 325 for driving the PCIe interface 230 interconnecting the first integrated circuit 210 and the second integrated circuit 220. For example, when the PCIe driver 325 is included in the first integrated circuit 210, it may allocate a logical channel for transmitting and receiving data to and from the second integrated circuit 220 through the PCIe interface 230. Although not shown, the device drivers 323 may include, for example, a display driver, a camera driver, a Bluetooth driver, a shared memory driver, a USB driver, a keypad driver, a WiFi driver, an audio driver, a touch device driver, or a pressure device driver.

In various embodiments, the middleware 330 may provide functions commonly required by the applications 370 or may provide various functions that allow the applications 370 to use limited system resources inside the electronic device. For example, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphics manager 351, a security manager 352, or an interface manager 353.

In one embodiment, the runtime library 335 may include a library module that is used by a compiler to add a new function through a programming language while an application 370 is being executed. The runtime library 335 may perform input/output management, memory management, or arithmetic function processing. For example, the runtime library 335 may include a radio interface layer (RIL) daemon that processes communication related to a telephony service of the electronic device 300. The ML daemon may manage information for session management provided from the network.

In one embodiment, the application manager 341 may manage the life cycle of each application 370. The window manager 342 may manage GUI resources used on the screen. The multimedia manager 343 may identify the format required for playing back a media file and perform encoding or decoding of the media file by using a codec suitable for the format. The resource manager 344 may manage the source code of the applications 370 or the memory space. The power manager 345 may manage the capacity, temperature, or power of the battery, and may determine or provide related information necessary for the operation of the electronic device 300 by using the corresponding battery information. In one embodiment, the power manager 345 may cooperate with the basic input/output system (BIOS) (not shown).

In one embodiment, the database manager 346 may create, search, or update a database to be used in an application 370. The package manager 347 may manage installation or update of an application distributed in the form of a package file. The connectivity manager 348 may manage a wireless connection or a wired connection between the electronic device 300 and an external electronic device. The notification manager 349 may provide a function for notifying the user of an occurrence of a designated event (e.g., incoming call, received message, or alarm). The location manager 350 may manage location information of the electronic device 300. The graphics manager 351 may manage a graphical effect to be provided to the user or a user interface related thereto. The security manager 352 may provide functions related to system security or user authentication.

In one embodiment, the interface manager 353 may manage an interface (e.g., PCIe interface 230) interconnecting a plurality of integrated circuits (e.g., first integrated circuit 210 and second integrated circuit 220 in FIG. 2A). For example, the interface manager 353 may restrict the power mode of the interface (e.g., PCIe interface 230) interconnecting integrated circuits from transitioning based on the required latency level associated with a service provided by the electronic device 300. As another example, the interface manager 353 may create a logical channel path (e.g., endpoint) of the interface (e.g., PCIe interface 230) for data transmission and reception between integrated circuits based on the required latency level associated with the service provided by the electronic device 300. As another example, the interface manager 353 may adjust at least one of the number of lanes or the link speed to be used for data transmission and reception in the interface (e.g., PCIe interface 230) based on the throughput required by the service provided by the electronic device 300.

In one embodiment, the middleware 330 may dynamically delete some of the existing components or add new components. In one embodiment, at least a portion of the middleware 330 may be included in the kernel 320 (or operating system) as a part thereof, or may be implemented as separate software different from the kernel 320 (or operating system).

In various embodiments, the applications 370 may include a network application 372 or a call handling application 374.

According to various embodiments, an electronic device (e.g., electronic device 101 in FIG. 1, electronic device 200 in FIG. 2A, or first electronic device 250 in FIG. 2B) may include: a first integrated circuit (e.g., first integrated circuit 210 or 260 of FIG. 2A or 2B); a second integrated circuit (e.g., second integrated circuit 220 or 280 of FIG. 2A or 2B); and a Peripheral Component Interconnect Express (PCIe) interface (e.g., PCIe interface 230 in FIG. 2A or 2B) interconnecting the first integrated circuit and the second integrated circuit, wherein the first integrated circuit may identify the required latency level associated with a service provided by the electronic device and may restrict the use of at least one power mode among a plurality of power modes supported by the PCIe interface based on the required latency level associated with the service.

In various embodiments, the first integrated circuit may include a processor (e.g., first processor 214 or 264 in FIG. 2A or 2B) and a PCIe host (e.g., PCIe host 212 or 262 in FIG. 2A or 2B) associated with the PCIe interface, wherein the processor may be configured to restrict the use of at least one power mode among a plurality of power modes supported by the PCIe interface based on the required latency level associated with the service provided by the electronic device.

In various embodiments, the processor may be configured to identify the required latency level associated with the service provided by the electronic device based on at least one of an application running on the electronic device, application requirements from the network, access to mobile edge computing (MEC), network session/bearer information, per-flow quality of service (QoS) information, UE route selection policy (URSP) related information, or local access data network (LADN) related information.

In various embodiments, the processor may be configured to restrict the use of at least one power mode based on the transition latency times of the plurality of power modes supported by the PCIe interface and the required latency level associated with a service provided by the electronic device.

In various embodiments, when an event occurs for a transition to a first mode among the plurality of power modes supported by the PCIe interface, the processor may be configured to check whether the transition latency time required for transitioning from the first mode to the active mode satisfies the required latency level associated with the service provided by the electronic device, and transition the power mode of the PCIe interface to the first mode if the transition latency time satisfies the required latency level associated with the service provided by the electronic device.

In various embodiments, the processor may be configured to restrict the power mode of the PCIe interface from transitioning to the first mode if the transition latency time fails to satisfy the required latency level associated with the service provided by the electronic device.

In various embodiments, when the service provided by the electronic device includes a low-latency requirement, the processor may be configured to generate a logical channel path of the PCIe interface associated with the service.

In various embodiments, the processor may be configured to set the number of lanes of the PCIe interface based on the throughput needed by the service provided by the electronic device.

In various embodiments, the processor may be configured to identify the required latency level associated with the service provided by the electronic device based on information received from the second integrated circuit.

In various embodiments, the first integrated circuit may include a first system-on-chip (SoC) related to an application processor, and the second integrated circuit may include a second system-on-chip related to a communication processor.

According to various embodiments, an electronic device (e.g., electronic device 101 in FIG. 1, electronic device 200 in FIG. 2A, or first electronic device 250 in FIG. 2B) may include: a first integrated circuit (e.g., first integrated circuit 210 or 260 in FIG. 2A or 2B) including a first processor (e.g., first processor 214 or 264 in FIG. 2A or 2B) and a peripheral component interconnect express (PCIe) host (e.g., PCIe host 212 or 262 in FIG. 2A or 2B); a second integrated circuit (e.g., second integrated circuit 220 or 280 in FIG. 2A or 2B) including a second processor (e.g., second processor 224 or 284 in FIG. 2A or 2B) and a PCIe device (e.g., PCIe device 222 or 282 in FIG. 2A or 2B); a PCIe interface (e.g., PCIe interface 230 in FIG. 2A or 2B) interconnecting the PCIe host of the first integrated circuit and the PCIe device of the second integrated circuit, wherein the first processor may be configured to identify the required latency level associated with a service provided by the electronic device and restrict the use of at least one power mode among a plurality of power modes supported by the PCIe interface based on the required latency level associated with the service.

Figure 4:
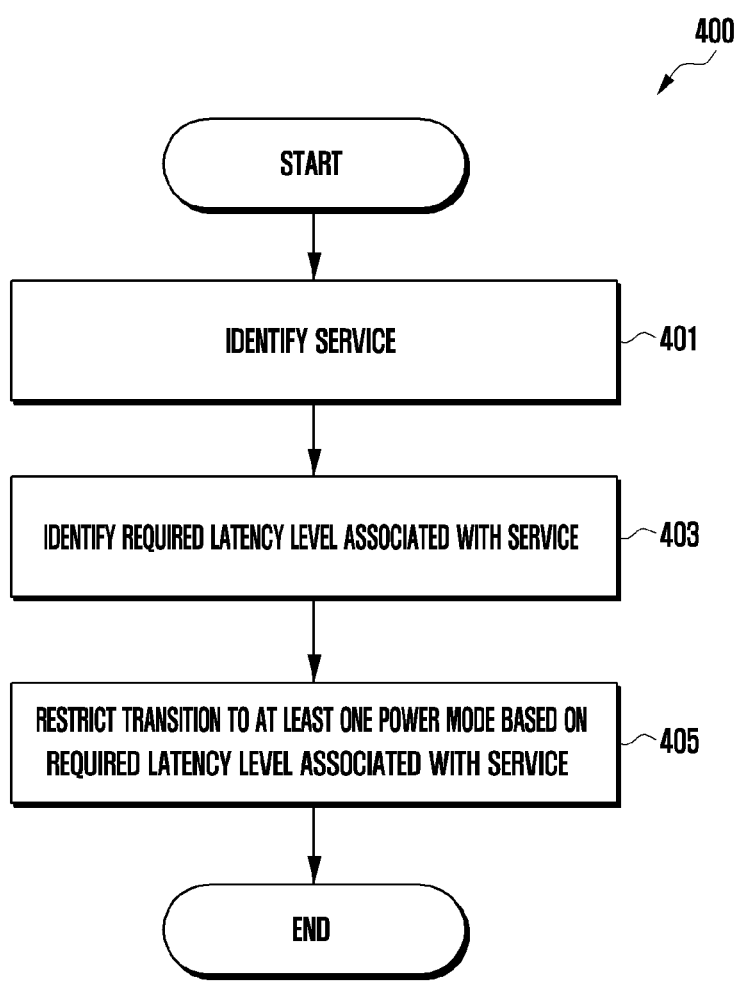
FIG. 4 illustrates a flowchart for setting a power mode of the interface to which transitioning is restricted in the electronic device according to various embodiments.

FIG. 4 illustrates a flowchart for setting a power mode of the interface to which transitioning is restricted in the electronic device, according to various embodiments. In the following embodiments, operations may be performed in sequence but are not necessarily performed sequentially. For example, some operations may be performed in an order different from the listed order, and at least two operations may be performed in parallel. As an example, the electronic device may correspond to the electronic device 101 in FIG. 1, the electronic device 200 in FIG. 2A, or the first electronic device 250 in FIG. 2B.

With reference to FIG. 4, in various embodiments, at operation 401, the electronic device (e.g., processor 120 in FIG. 1, first processor 214 in FIG. 2A, or first processor 264 in FIG. 2B) may identify a service provided by the electronic device (e.g., electronic device 200 in FIG. 2A). In one embodiment, the first processor 214 may identify the service (e.g., eMBB service or URLLC service) corresponding to an application (e.g., foreground application) running on the electronic device 200. In one embodiment, the first processor 214 may check whether an application using a session (or IP flow) related to the URLLC service is running on the electronic device 200 based on a parameter received from the network. For instance, the relationship between the session (or IP flow) related to the URLLC service and the application may be created or updated during application installation or application execution. In one embodiment, the first processor 214 may check whether the electronic device 200 has a session (or IP flow) related to the URLLC service based on a parameter received from the network. For instance, the parameter received from the network may be included in radio resource control (RRC) signaling or in the URSP. For example, the electronic device 200 may receive a policy related to session (or IP flow) management from the network based on the URSP defined as shown in Table 1. There are three components of the USRP policy rule: "rule precedence" to apply different priorities to different rules, "traffic descriptor" to distinguish traffic, and "route selection descriptor" to define the traffic route. For example, the traffic descriptor may include an application identifier or IP packet filter. The route selection descriptor may include a session and service continuity (SSC) mode, network slice selection, or a data network name (DNN). For example, the URSP of Table 1 may be defined in a standard document (TS23.503).

TABLE 1

| Information name | Description | Category | PCF permitted to modify in a UE context | Scope |
|---|---|---|---|---|
| Rule Precedence | Determines the order the URSP rule is enforced in the UE | Mandatory (NOTE 1) | Yes | UE context |
| Traffic descriptor | This part defines the traffic descriptors for the policy. | | | |
| Application identifiers | Application identifier(s) | Optional | Yes | UE context |
| IP descriptors | IP 3 tuple(s) (destination IP address or IPv6 network prefix, destination port number, protocol ID of the protocol above IP). | Optional | Yes | UE context |
| Non-IP descriptors | Descriptor(s) for Non-IP traffic | Optional | Yes | UE context |
| List of Route Selection Descriptors | A list of Route Selection Descriptors. The components of a Route Selection Descriptor are described in table 6.6.2.1-3. | Mandatory | | |

TABLE 1-continued

| Information name | Description | Category | PCF permitted to modify in a UE context | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either a single value or a list of values of S-NSSAI(s). | Optional | Yes | UE context |
| DNN Selection | Either a single value or a list of values of DNN(s). | Optional | Yes | UE context |
| Non-Seamless Offload indication | Indicates if the traffic of the matching application is to be offloaded to non-3GPP access outside of a PDU Session. | Optional (NOTE 3) | Yes | UE context |
| Access Type preference | Indicates the preferred Access Type (3GPP or non-3GPP or Multi-Access) when the UE establishes a PDU Session for the matching application. | Optional | Yes | UE context |

As an example, the URSP may be configured in advance in the electronic device 200. As an example, the URSP may be received by the electronic device 200 from the network (e.g., policy control function (PCF)) through a registration procedure or a UE configuration update procedure. The URSP received from the PCF may have a higher priority than the URSP preconfigured in the electronic device 200.

In various embodiments, at operation 403, the electronic device (e.g., processor 120, 214 or 264) may identify the required latency level associated with the service provided by the electronic device (e.g., electronic device 200 in FIG. 2A). As an example, the required latency level may include a maximum delay time (e.g., end-to-end delay requirement) required by the service provided by the electronic device 200. As an example, the required latency level may be identified based on information received by the first integrated circuit 210 from the second integrated circuit 220.

In various embodiments, at operation 405, the electronic device (e.g., processor 120, 214 or 264) may restrict a transition to at least one power mode among a plurality of power modes supported by the PCIe interface (e.g., PCIe interface 230 in FIG. 2A) based on the required latency level associated with the service provided by the electronic device (e.g., electronic device 200 in FIG. 2A). In one embodiment, the PCIe interface 230 may support at least one power mode among L0 (fully active state), L0s (electrical idle/standby state), L1 (lower power standby/slumber state), L2 (low power sleep state), and L3 (link off state). In one embodiment, support or use of the power mode may be controlled based on the value of a bitfield (e.g., 0 to 1 bit) of a second range of "link control register". For example, when the bitfield of the second range of the link control register is encoded as "00", this indicates that power modes L0s and L1 are not used; the bitfield encoded as "01" indicates that power mode L0s is used; the bitfield encoded as "10" indicates that power mode L1 is used; and the bitfield encoded as "11" indicates that power modes L0s and L1 are both used. As an example, the bitfield value of the second range of the link control register may be set based on the required latency level. In one embodiment, support or use of power mode L1 may be controlled through bits (e.g., 0 to 3 bits) of a first range of "L1 PM substates control 1 register". For example, "bit 0" of the L1 PM substates control 1 register indicates whether PCI (peripheral component interconnect)-PM (power management) L1.2 is enabled; "bit 1" indicates whether PCI-PM L1.1 is enabled; "bit 2" indicates whether ASPM (active state power management) L1.2 is enabled; and "bit 3" indicates whether ASPM L1.1 is enabled. For example, the bits of the first range of the L1 PM substates control 1 register may be set based on the required latency level. For instance, when the required latency level is relatively shorter than the delay time required to transition from the L2 mode to the L0 mode, the first processor 214 may restrict a transition to the L2 mode. As another example, when the required latency level is relatively longer than the delay time required to transition from the L1 mode to the L0 mode, the first processor 214 may allow a transition to the L1 mode.

In various embodiments, the electronic device 200 may restrict a transition to at least one power mode among the plurality of power modes supported by the PCIe interface 230 based on the required latency level associated with the service provided by the electronic device 200 and the processing delay time of the processor (e.g., first processor 214 and/or second processor 224) in the integrated circuit. In one embodiment, when the delay time required to transition from the L2 mode to the L0 mode is relatively longer than the sum of the required latency level and the processing delay time of the first processor 214, the first processor 214 may restrict a transition to the L2 mode.

In one embodiment, the value of the bitfield (e.g., 0 to 1 bit) of the second range of the link control register may be set based on the required latency level and the processing delay time of the processor in the integrated circuit (e.g., first processor 214 of the first integrated circuit 210 and/or second processor 224 of the second integrated circuit 220). In one embodiment, as an example, the bits of the first range of the L1 PM substates control 1 register may be set based on the required latency level and the processing delay time of the processor in the integrated circuit. For example, when the delay time required to transition from the L1 mode to the L0 mode is relatively shorter than the sum of the required latency level and the processing delay time of the first processor 214, the first processor 214 may allow a transition to the L1 mode.

Figure 5:
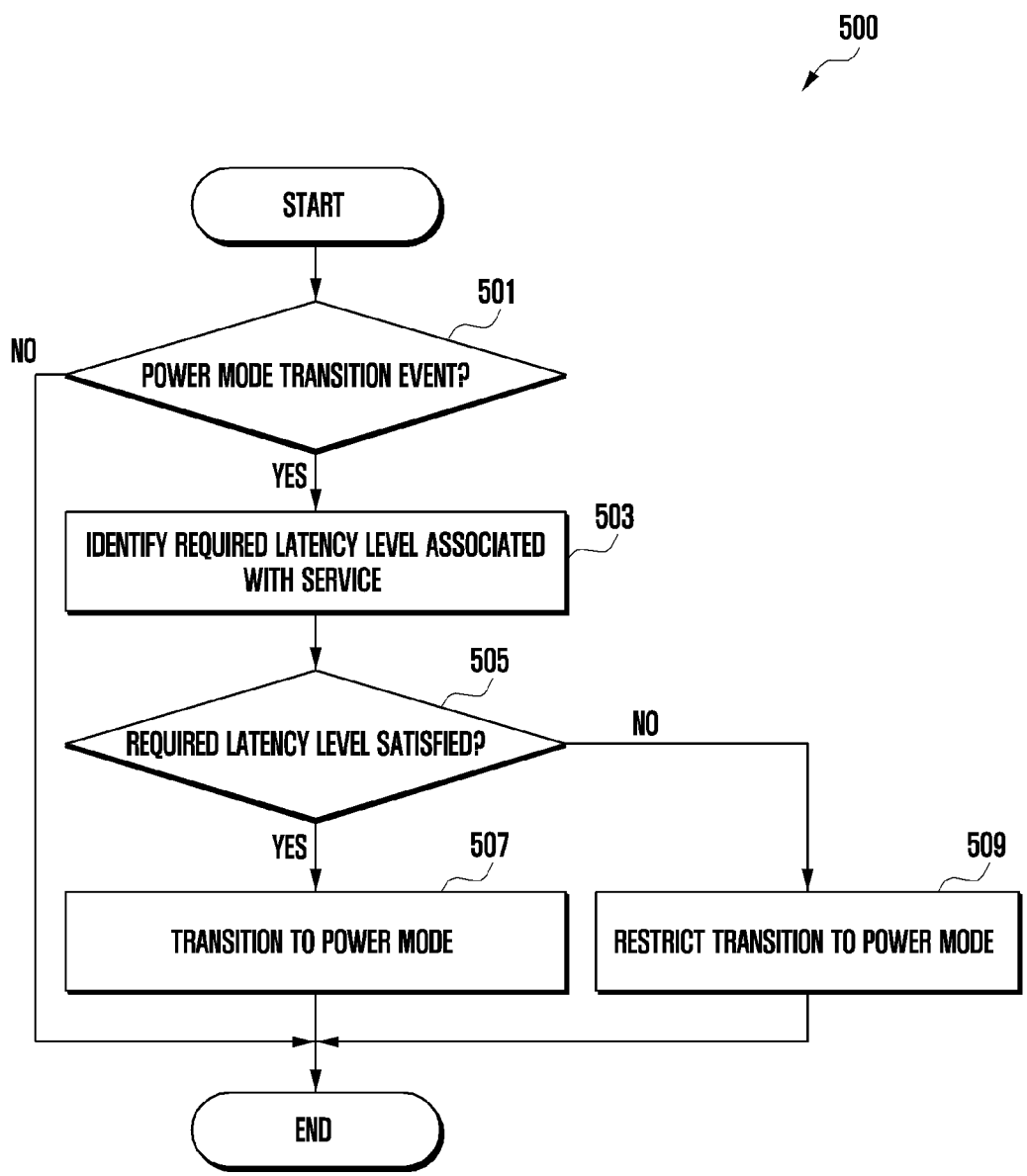
FIG. 5 illustrates a flowchart for restricting the power mode of the interface from transitioning in the electronic device according to various embodiments.

FIG. 5 illustrates a flowchart for restricting the power mode of the interface from transitioning in the electronic device according to various embodiments. In the following embodiments, operations may be performed in sequence but are not necessarily performed sequentially. For example, some operations may be performed in an order different from the listed order, and at least two operations may be performed in parallel. As an example, the electronic device may correspond to the electronic device 101 in FIG. 1, the electronic device 200 in FIG. 2A, or the first electronic device 250 in FIG. 2B.

With reference to FIG. 5, in various embodiments, at operation 501, the electronic device (e.g., processor 120 in FIG. 1, first processor 214 in FIG. 2A, or first processor 264 in FIG. 2B) may check whether an occurrence of an event for transitioning the power mode of the PCIe interface (e.g., PCIe interface 230 in FIG. 2A or 2B) is detected. In one embodiment, the first processor 214 may check whether the condition for transitioning the power mode is satisfied based on the operating state of the PCIe interface 230. For example, the operating state of the PCIe interface 230 may include at least one of data transmission or reception through the PCIe interface 230 or the time of not using the PCIe interface 230.

In various embodiments, if an occurrence of an event for transitioning the power mode of the PCIe interface (e.g., PCIe interface 230 in FIG. 2A or 2B) is not detected (e.g., "no"-branch of operation 501), the electronic device (e.g., processor 120, 214 or 264) may control an operation to maintain the power mode of the PCIe interface (e.g., PCIe interface 230 in FIG. 2A or 2B). In one embodiment, if an occurrence of an event for transitioning the power mode of the PCIe interface 230 is not detected, the first processor 214 may control the PCIe host 212 to maintain the power mode of the PCIe interface 230.

In various embodiments, if an occurrence of an event for transitioning the power mode of the PCIe interface (e.g., PCIe interface 230 in FIG. 2A or 2B) is detected (e.g., "yes"-branch of operation 501), at operation 503, the electronic device (e.g., processor 120, 214 or 264) may identify the required latency level associated with the service provided by the electronic device (e.g., electronic device 200 in FIG. 2A). In one embodiment, the first processor 214 may identify the required latency level associated with the service based on at least one of an application running on the electronic device 200, application requirements from the network, access to MEC, network session and/or bearer information, per-flow quality of service (QoS), URSP-related information, or LADN-related information. In one embodiment, the first processor 214 may identify the required latency level associated with the service based on the content of an application running on the electronic device 200. For example, the first processor 214 may recognize that the required latency level in a state where virtual reality (VR) or augmented reality (AR) content is displayed for an application is different from the required latency level in a state where an application loading or configuration menu is displayed.

In various embodiments, at operation 505, the electronic device (e.g., processor 120, 214 or 264) may check whether the delay time associated with the power mode transition satisfies the required latency level associated with the service provided by the electronic device. For instance, the delay time associated with the power mode transition may include the delay time required by the PCIe interface 230 to transition from the power mode (e.g., L2 mode) corresponding to the power mode transition event to the active mode (e.g., L0 mode). For example, the first processor 214 may identify the delay time associated with a power mode transition based on "root complex link capabilities register" defined as shown in Table 2.

TABLE 2

| Parameter | Description |
| --- | --- |
| L0s Exit Latency | Time value required to complete a transition from L0s to L0<br>000b: Less than 64 ns<br>001b: 64 ns to less than 128 ns<br>010b: 128 ns to less than 256 ns<br>011b: 256 ns to less than 512 ns<br>100b: 512 ns to less than 1 μs<br>101b: 1 μs to less than 2 μs<br>110b: 2 μs to 4 μs<br>111b: More than 4 μs |
| L1 Exit Latency | Time value required to complete a transition from L1 to L0<br>000b: Less than 1 μs<br>001b: 1 μs to less than 2 μs<br>010b: 2 μs to less than 4 μs<br>011b: 4 μs to less than 8 μs<br>100b: 8 μs to less than 16 μs<br>101b: 16 μs to less than 32 μs<br>110b: 32 μs to 64 μs<br>111b: More than 64 μs |

In various embodiments, if the delay time associated with the power mode transition satisfies the required latency level associated with the service provided by the electronic device (e.g., "yes"-branch of operation 505), at operation 507, the electronic device (e.g., processor 120, 214 or 264) may transition the power mode of the PCIe interface (e.g., PCIe interface 230 in FIG. 2A or 2B) to the power mode corresponding to the event. In one embodiment, if the required latency level is relatively longer than the delay time (e.g., 256 ns) required to transition from the L0s mode to the L0 mode, the first processor 214 may allow a transition to the L0s mode. In this case, the first processor 214 may control the PCIe host 212 to transmit the PCIe device 222 a control signal for transitioning the power mode of the PCIe interface 230 to the L0s mode. For example, the PCIe host 212 may transmit information about a power mode transition to the PCIe device 222 based on the bitfield value of the second range of the link control register.

In various embodiments, if the delay time associated with the power mode transition fails to satisfy the required latency level associated with the service provided by the electronic device (e.g., "no"-branch of operation 505), at operation 509, the electronic device (e.g., processor 120, 214 or 264) may restrict the power mode of the PCIe interface (e.g., PCIe interface 230 in FIG. 2A or 2B) from transitioning to the power mode corresponding to the event. In one embodiment, if the required latency level is relatively shorter than the delay time (e.g., 64 μs) required to transition from the L1 mode to the L0 mode, the first processor 214 may restrict a transition to the L1 mode. In this case, the first processor 214 may prevent transmission of a control signal for transitioning the power mode of the PCIe interface 230 to the L1 mode.

In various embodiments, when the electronic device 200 provides a plurality of services, the electronic device 200 may determine whether to transition the power mode of the PCIe interface 230 based on the shortest required latency level among the required latency levels associated with the plurality of services. In one embodiment, if the required latency level of a first service provided by the electronic device 200 is $R^1$ and the required latency level of an $n^{th}$ service is IV, the first processor 214 may determine whether to transition the power mode of the PCIe interface 230 based on $MIN(R^1, \ldots, R^n)$.

Figure 6:
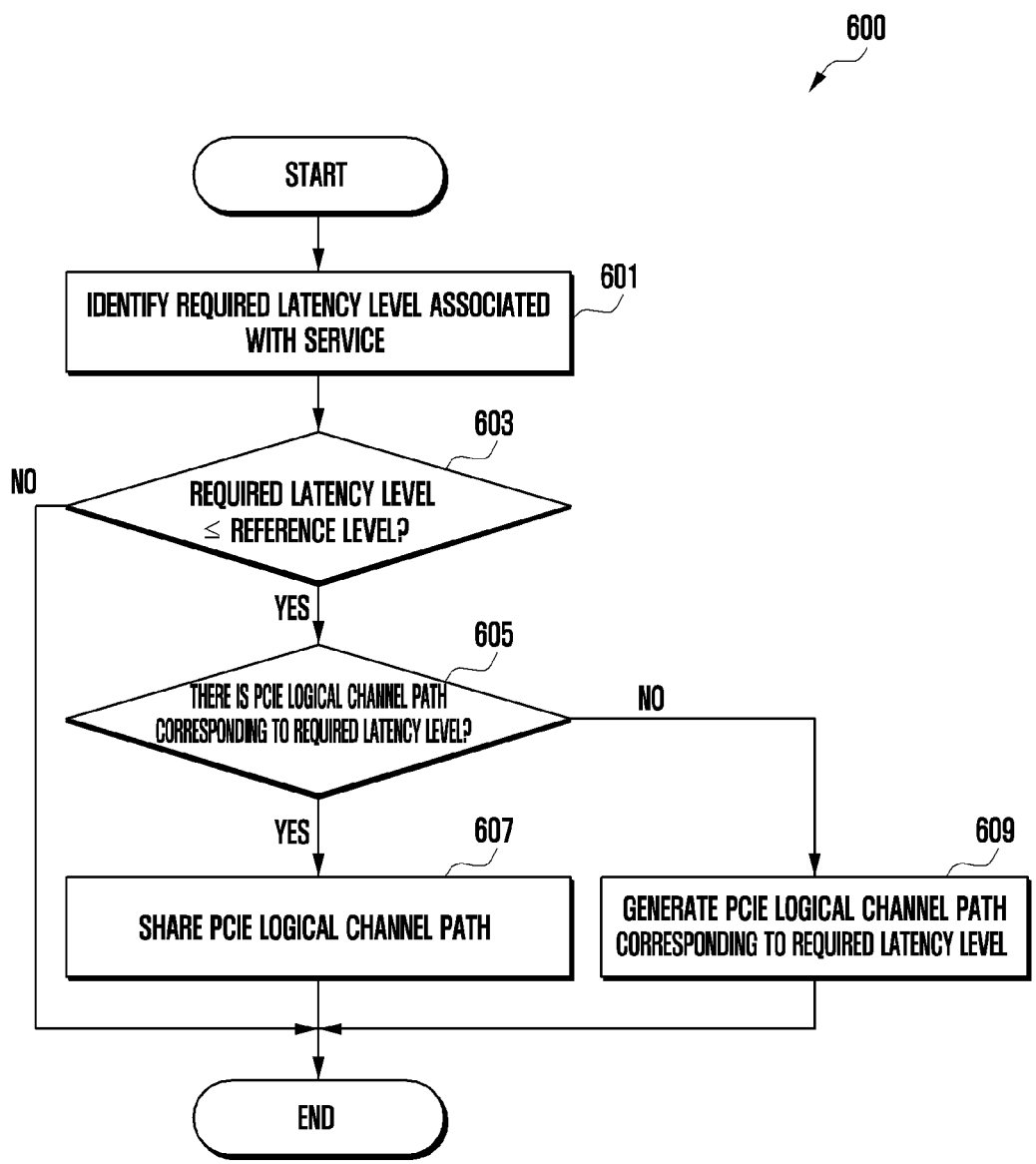
FIG. 6 illustrates a flowchart for generating a logical channel of the interface in the electronic device according to various embodiments.

FIG. 6 illustrates a flowchart for generating a logical channel of the interface in the electronic device according to various embodiments. In the following embodiments, operations may be performed in sequence but are not necessarily performed sequentially. For example, some operations may be performed in an order different from the listed order, and at least two operations may be performed in parallel. As an example, the electronic device may correspond to the electronic device 101 in FIG. 1, the electronic device 200 in FIG. 2A, or the first electronic device 250 in FIG. 2B.

With reference to FIG. 6, in various embodiments, at operation 601, the electronic device (e.g., processor 120 in FIG. 1, first processor 214 in FIG. 2A, or first processor 264 in FIG. 2B) may identify the required latency level associated with the service provided by the electronic device (e.g., electronic device 200 in FIG. 2A). In one embodiment, the required latency level associated with the service may be identified based on at least one of an application running on the electronic device 200, application requirements from the network, access to MEC, network session and/or bearer information, per-flow quality of service (QoS), URSP-related information, or LADN-related information.

In various embodiments, at operation 603, the electronic device (e.g., processor 120, 214 or 264) may check whether the required latency level associated with the service provided by the electronic device (e.g., electronic device 200 in FIG. 2A) is less than or equal to the reference level. For example, the reference level is a reference value for determining whether the service provided by the electronic device 200 has a low-latency requirement, and may be fixed or may be changed based on the electronic device or the network.

In various embodiments, if the required latency level associated with the service provided by the electronic device (e.g., electronic device 200 in FIG. 2A) is greater than the reference level (i.e., "no"-branch of operation 603), the electronic device (e.g., processor 120, 214 or 264) may determine that the service provided by the electronic device (e.g., electronic device 200 in FIG. 2A) does not have a low-latency requirement.

In various embodiments, if the required latency level associated with the service provided by the electronic device (e.g., electronic device 200 in FIG. 2A) is less than or equal to the reference level (i.e., "yes"-branch of operation 603), at operation 605, the electronic device (e.g., processor 120, 214 or 264) may check whether there is a PCIe logical channel path corresponding to the latency requirement related to the service provided by the electronic device (e.g., electronic device 200 in FIG. 2A). In one embodiment, if the required latency level associated with the service provided by the electronic device 200 is less than or equal to the reference level, the first processor 214 may determine that the service provided by the electronic device 200 has a low-latency requirement. In this case, the first processor 214 may check whether there is a logical channel path satisfying the low-latency requirement (e.g., QoS) among the logical channel paths generated for data transmission and reception with the second integrated circuit 220 (or PCIe device 222).

In various embodiments, if there is a PCIe logical channel path corresponding to the latency requirement related to the service provided by the electronic device (e.g., electronic device 200 in FIG. 2A) (e.g., "yes"-branch of operation 605), at operation 607, the electronic device (e.g., processor 120, 214 or 264) may share the PCIe logical channel path corresponding to the latency requirement related to the service provided by the electronic device (e.g., electronic device 200 in FIG. 2A). In one embodiment, the first processor 214 may exchange data with the second integrated circuit 220 (or PCIe device 222) through the logical channel path satisfying the low-latency requirement (e.g., QoS) among the logical channel paths generated for data transmission and reception with the second integrated circuit 220 (or PCIe device 222).

In various embodiments, if there is no PCIe logical channel path corresponding to the latency requirement related to the service provided by the electronic device (e.g., electronic device 200 in FIG. 2A) (e.g., "no"-branch of operation 605), at operation 609, the electronic device (e.g., processor 120, 214 or 264) may generate a PCIe logical channel path corresponding to the latency requirement related to the service provided by the electronic device (e.g., electronic device 200 in FIG. 2A). In one embodiment, the first processor 214 may newly allocate a logical channel path leading to the second integrated circuit 220 (or PCIe device 222) for the low-latency requirement (e.g., QoS). The quality of service of the newly allocated logical channel path may be set in accordance with low-latency data transmission. The first processor 214 may control the PCIe host 212 to transmit and/or receive data to and from the second integrated circuit 220 (or PCIe device 222) through the newly allocated logical channel path.

In various embodiments, the electronic device 200 may determine whether the service provided by the electronic device 200 has a low-latency requirement based on identification information of the service. In one embodiment, when the service corresponding to an application running on the electronic device 200 is an eMBB service, the first processor 214 may determine that the service provided by the electronic device 200 does not have a low-latency requirement. In one embodiment, when the service corresponding to an application running on the electronic device 200 is a URLLC service, the first processor 214 may determine that the service provided by the electronic device 200 has a low-latency requirement.

In various embodiments, upon determining that the service provided by the electronic device 200 has a low-delay requirement, the electronic device 200 may generate a logical channel path of the PCIe interface 230 corresponding to the low-delay requirement. In this case, operations 605 and 607 of FIG. 6 may be omitted.

According to various embodiments, an operation method of an electronic device (e.g., electronic device 101 in FIG. 1, electronic device 200 in FIG. 2A, or first electronic device 250 in FIG. 2B) may include: identifying the required latency level associated with the service provided by the electronic device; and restricting, based on the required latency level associated with the service provided by the electronic device, the use of at least one power mode among a plurality of power modes supported by a Peripheral Component Interconnect Express (PCIe) interface (e.g., PCIe interface 230 in FIG. 2A or 2B) interconnecting a first integrated circuit (e.g., first integrated circuit 210 or 260 in FIG. 2A or 2B) and a second integrated circuit (e.g., second integrated circuit 220 or 280 in FIG. 2A or 2B).

In various embodiments, identifying the required latency level associated with the service may include identifying the required latency level associated with the service provided by the electronic device based on at least one of an application running on the electronic device, application requirements from the network, access to mobile edge computing (MEC), network session and/or bearer information, per-flow quality of service (QoS) information, UE route selection policy (URSP)-related information, or local access data network (LADN)-related information.

In various embodiments, restricting the use of at least one power mode may include: comparing the transition latency times of the plurality of power modes supported by the PCIe interface with the required latency level associated with the service provided by the electronic device; and restricting the use of at least one power mode among the plurality of power modes supported by the PCIe interface based on the result of comparison.

In various embodiments, restricting the use of at least one power mode may include restricting a transition to a first mode among the plurality of power modes supported by the PCIe interface if the transition latency time required to transition from the first mode to the active mode does not satisfy the required latency level associated with the service provided by the electronic device.

In various embodiments, the operation method may further include permitting a transition to the first mode if the transition latency time required to transition from the first mode to the active mode satisfies the required latency level associated with the service provided by the electronic device.

In various embodiments, restricting the use of at least one power mode may include: comparing the sum of the required latency level associated with the service provided by the electronic device and the processing delay time of a first processor or second processor with the transition latency times of the plurality of power modes supported by the PCIe interface; and restricting the use of at least one power mode among the plurality of power modes supported by the PCIe interface based on the result of comparison.

In various embodiments, the operation method may further include generating, if the service provided by the electronic device has a low-latency requirement, a logical channel path of the PCIe interface related to the service.

In various embodiments, the operation method may further include setting the number of lanes of the PCIe interface based on the throughput needed by the service provided by the electronic device.

In various embodiments, the first integrated circuit may include a first system-on-chip (SoC) related to an application processor, the second integrated circuit may include a second system-on-chip related to a communication processor, and the communication processor may support new radio (NR) communication.

According to various embodiments of the disclosure, the electronic device can provide a delay-sensitive service while reducing power consumption due to an interface by restricting a transition to at least some of a plurality of power modes supported by the interface (e.g., PCIe or USB) that interconnects a plurality of integrated circuits based on the required latency level associated with the service.

In various embodiments, the electronic device can smoothly provide a delay-sensitive service by generating a logical channel (e.g., endpoint) associated with the delay-sensitive service through an interface (e.g., PCIe or USB) interconnecting multiple integrated circuits.

In various embodiments, the electronic device can reduce power consumption due to an interface by adjusting the number of lanes of the interface (e.g., PCIe or USB) interconnecting multiple integrated circuits based on the throughput needed by the service.

Hereinabove, various embodiments of the disclosure have been shown and described for the purpose of illustration and understanding without limiting the subject matter of the disclosure. It should be understood by those skilled in the art that many variations and modifications of the concepts described herein will still fall within the spirit and scope of this disclosure as defined in the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first integrated circuit;
a second integrated circuit; and
a peripheral component interconnect express (PCIe) interface interconnecting the first integrated circuit and the second integrated circuit,
wherein the first integrated circuit is configured to:
identify a required latency level associated with a service provided by the electronic device, and
restrict use of at least one power mode among a plurality of power modes supported by the PCIe interface based on the required latency level associated with the service.

2. The electronic device of claim 1, wherein:
the first integrated circuit includes a processor and a PCIe host associated with the PCIe interface; and
the processor is configured to restrict the use of at least one power mode among the plurality of power modes supported by the PCIe interface, based on the required latency level associated with the service provided by the electronic device.

3. The electronic device of claim 1, wherein:
the first integrated circuit includes a first system-on-chip (SoC) related to an application processor; and
the second integrated circuit includes a second system-on-chip related to a communication processor.

4. The electronic device of claim 2, wherein the processor is further configured to:
identify the required latency level associated with the service provided by the electronic device based on at least one of an application running on the electronic device, application requirements from a network, access to mobile edge computing (MEC), network session or bearer information, per-flow quality of service (QoS) information, UE route selection policy (URSP)-related information, or local access data network (LADN)-related information.

5. The electronic device of claim 2, wherein the processor is further configured to restrict the use of at least one power mode, based on transition latency times of the plurality of power modes supported by the PCIe interface and the required latency level associated with the service provided by the electronic device.

6. The electronic device of claim 2, wherein, in response to an event for a transition to a first mode among the plurality of power modes supported by the PCIe interface, the processor is further configured to:
determine whether a transition latency time required for transitioning from the first mode to an active mode satisfies the required latency level associated with the service provided by the electronic device; and
in response to the transition latency time satisfying the required latency level associated with the service provided by the electronic device, transition the power mode of the PCIe interface to the first mode.

7. The electronic device of claim 2, wherein in response to the service provided by the electronic device having a low-latency requirement, the processor is configured to:
generate a logical channel path of the PCIe interface associated with the service.

8. The electronic device of claim 2, wherein the processor is configured to set a number of lanes of the PCIe interface based on throughput needed by the service provided by the electronic device.

9. The electronic device of claim 2, wherein the processor is configured to identify the required latency level associated with the service provided by the electronic device based on information received from the second integrated circuit.

10. The electronic device of claim 6, wherein the processor is configured to:
in response to the transition latency time failing to satisfy the required latency level associated with the service provided by the electronic device, restrict a transition to the first mode.

11. An operation method of an electronic device, the operation method comprising:
identifying a required latency level associated with a service provided by the electronic device; and
restricting, based on the required latency level associated with the service provided by the electronic device, use of at least one power mode among a plurality of power modes supported by a Peripheral Component Interconnect Express (PCIe) interface interconnecting a first integrated circuit and a second integrated circuit.

12. The operation method of claim 11, wherein identifying a required latency level associated with a service comprises:
identifying the required latency level associated with the service provided by the electronic device based on at least one of an application running on the electronic device, application requirements from a network, access to mobile edge computing (MEC), network session or bearer information, per-flow quality of service (QoS) information, UE route selection policy (URSP)-related information, or local access data network (LADN)-related information.

13. The operation method of claim 11, wherein restricting use of at least one power mode comprises:
comparing transition latency times of the plurality of power modes supported by the PCIe interface with the required latency level associated with the service provided by the electronic device; and
restricting the use of at least one power mode among the plurality of power modes supported by the PCIe interface, based on a result of comparison.

14. The operation method of claim 13, wherein restricting use of at least one power mode further comprises:
restricting a transition to a first mode among the plurality of power modes supported by the PCIe interface in response to a transition latency time required to transition from the first mode to an active mode fails to satisfy the required latency level associated with the service provided by the electronic device.

15. The operation method of claim 11, wherein restricting use of at least one power mode further comprises:
comparing a sum of the required latency level associated with the service provided by the electronic device and a processing delay time of a first processor or a second processor with transition latency times of the plurality of power modes supported by the PCIe interface; and
restricting the use of at least one power mode among the plurality of power modes supported by the PCIe interface based on a result of comparison.

16. The operation method of claim 11, further comprising:
generating a logical channel path of the PCIe interface related to the service in response to the service provided by the electronic device having a low-latency requirement.

17. The operation method of claim 11, further comprising:
setting a number of lanes of the PCIe interface based on throughput needed by the service provided by the electronic device.

18. The operation method of claim 11, wherein:
the first integrated circuit includes a first system-on-chip (SoC) related to an application processor;
the second integrated circuit includes a second system-on-chip related to a communication processor; and
the communication processor supports new radio (NR) communication.

19. The operation method of claim 14, further comprising:
permitting a transition to the first mode in response to the transition latency time required to transition from the first mode to the active mode satisfies the required latency level associated with the service provided by the electronic device.

20. An electronic device comprising:
a first integrated circuit including a first processor and a peripheral component interconnect express (PCIe) host;
a second integrated circuit including a second processor and a PCIe device; and
a PCIe interface interconnecting the PCIe host of the first integrated circuit and the PCIe device of the second integrated circuit,
wherein the first processor is configured to:
identify a required latency level associated with a service provided by the electronic device, and
restrict use of at least one power mode among a plurality of power modes supported by the PCIe interface based on the required latency level associated with the service.

* * * * *